Feb. 3, 1931. J. S. SHAW ET AL 1,790,772
SPEED VARYING AND REVERSING GEAR
Filed March 17, 1928 7 Sheets-Sheet 1
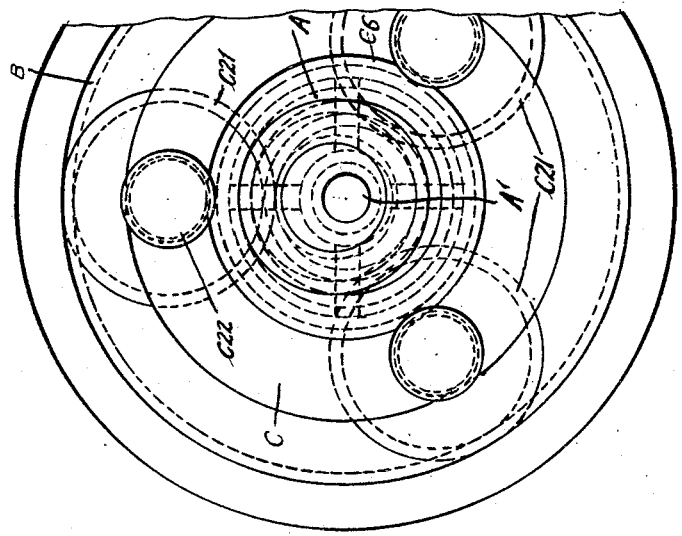
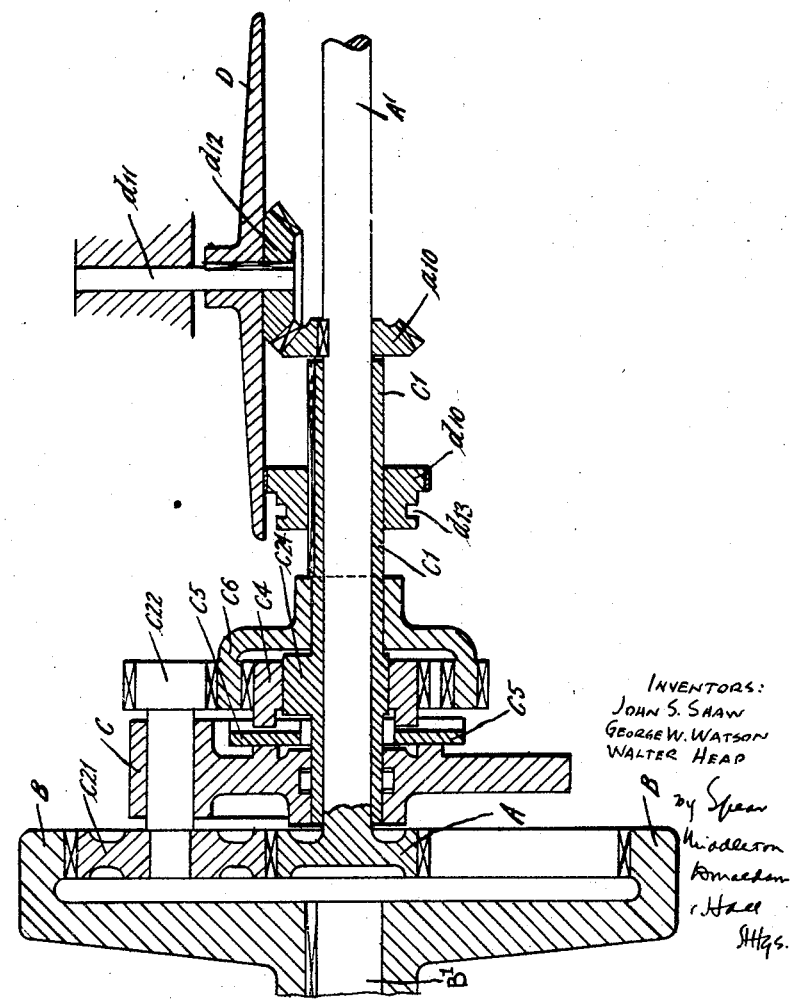
INVENTORS:
JOHN S. SHAW
GEORGE W. WATSON
WALTER HEAP

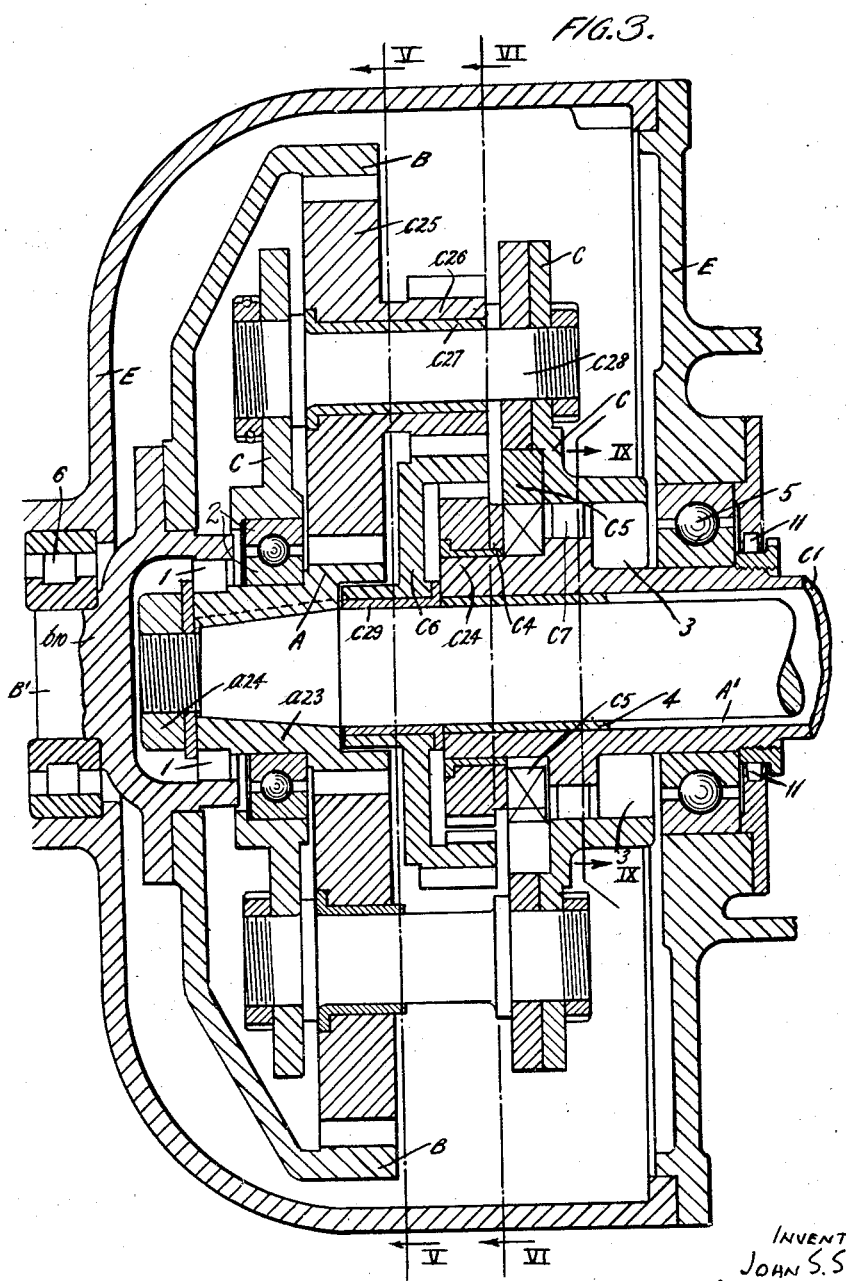

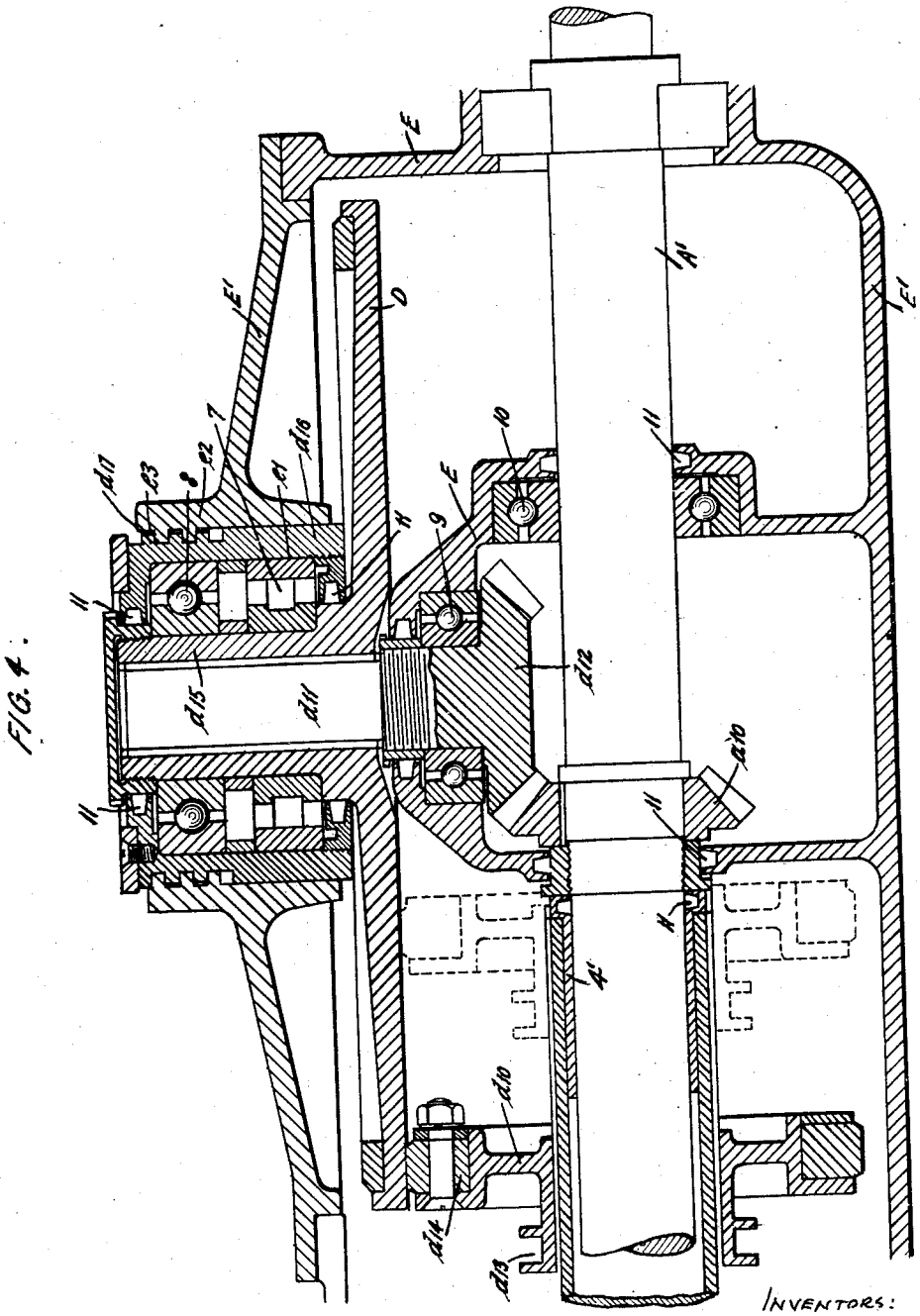

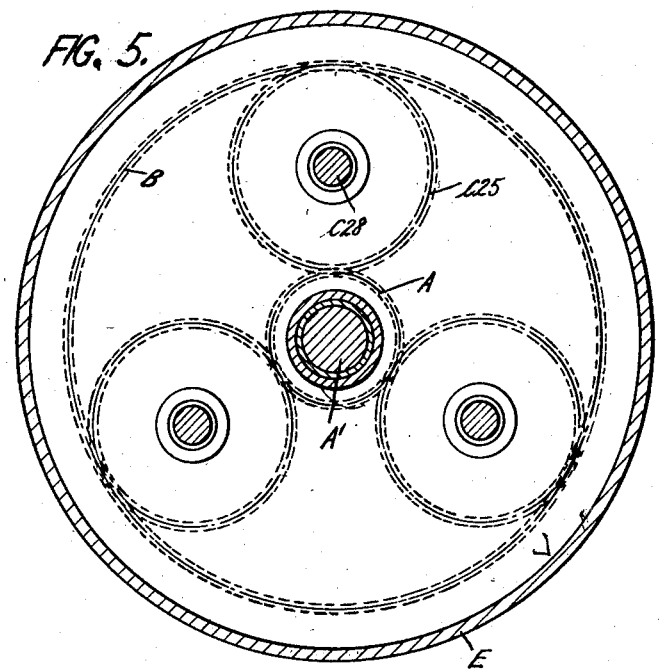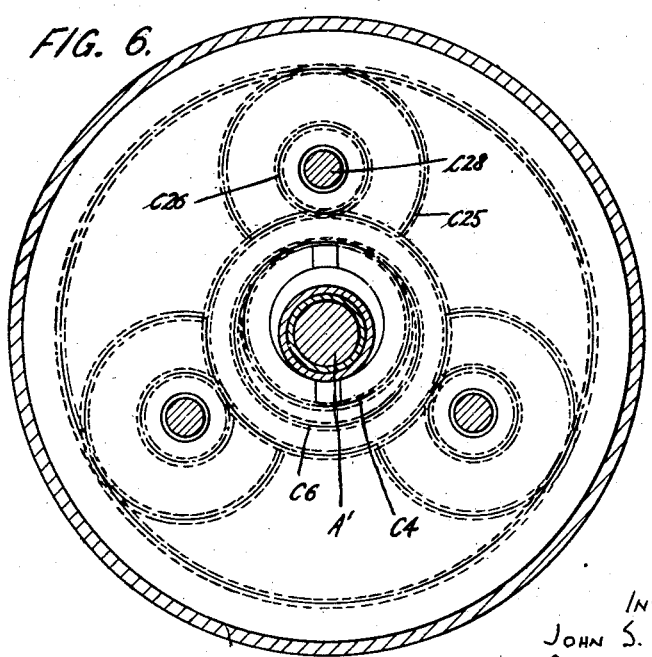

Feb. 3, 1931. J. S. SHAW ET AL 1,790,772
SPEED VARYING AND REVERSING GEAR
Filed March 17, 1928  7 Sheets-Sheet 5

INVENTORS:
JOHN S. SHAW
GEORGE W. WATSON
WALTER HEAP

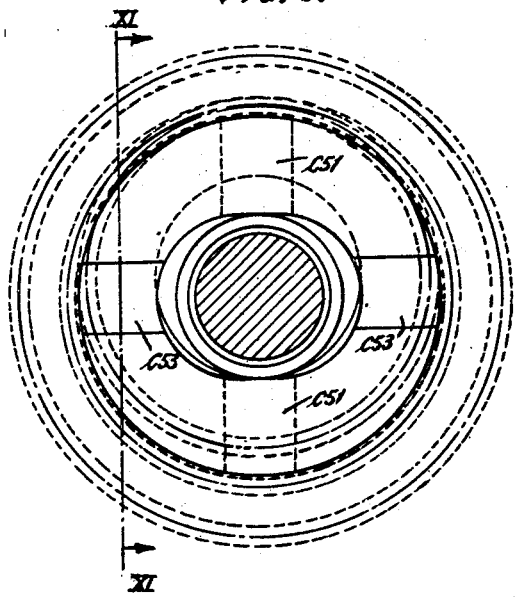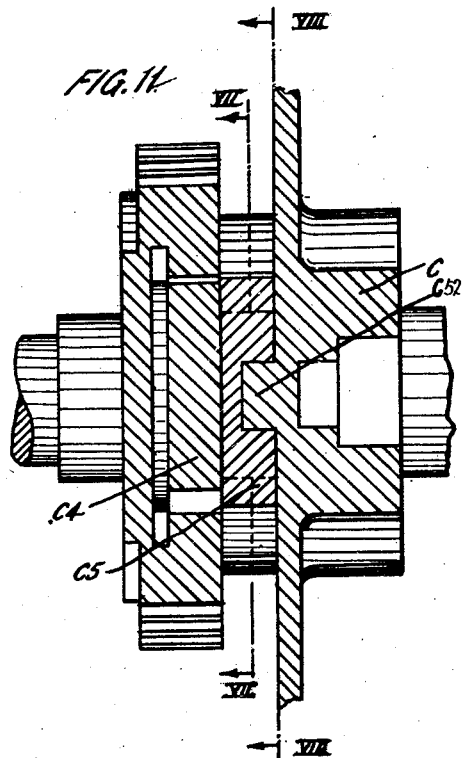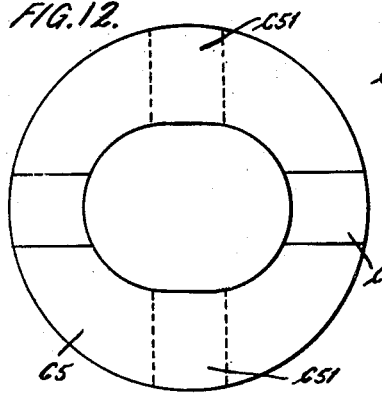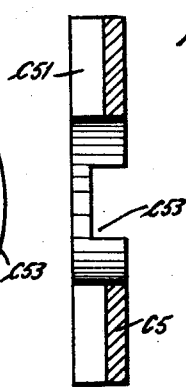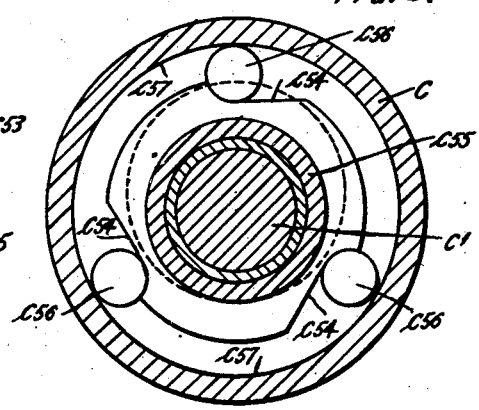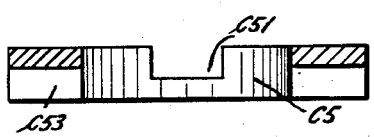
INVENTORS:
JOHN S. SHAW
GEORGE W. WATSON
WALTER HEAP

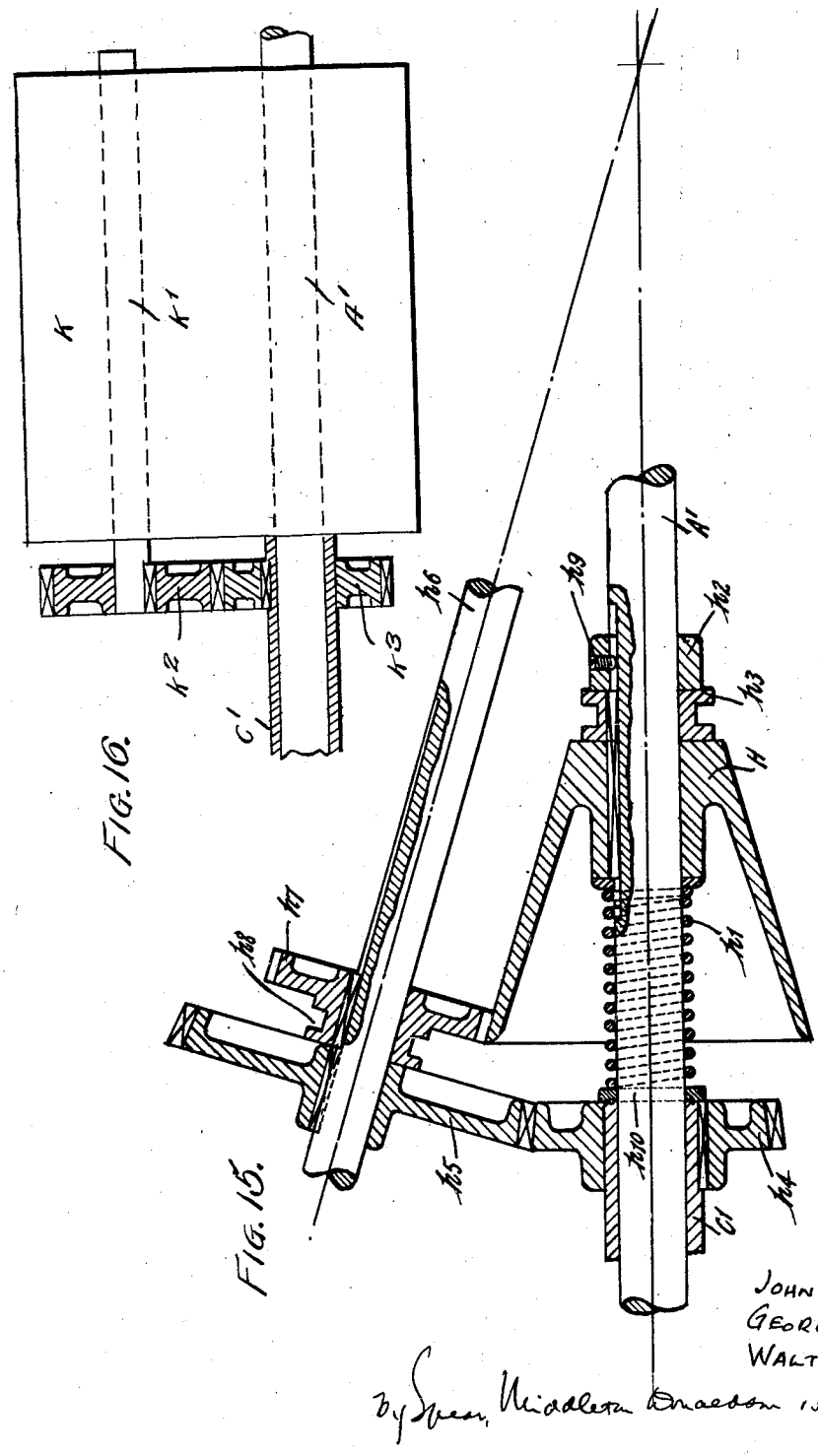

Patented Feb. 3, 1931

1,790,772

UNITED STATES PATENT OFFICE

JOHN STANDEN SHAW, OF LIVERPOOL, GEORGE WILLIAM WATSON, OF LONDON, AND WALTER HEAP, OF LIVERPOOL, ENGLAND

SPEED-VARYING AND REVERSING GEAR

Application filed March 17, 1928, Serial No. 262,402, and in Great Britain March 22, 1927.

This invention relates to improvements in speed varying and reversing gear for motor vehicles, and the object is to provide a speed-varying gear, preferably of the type in which the changes instead of being made step-by-step, as in an ordinary gear box, are made continuously, the arrangement being such that at a certain speed (or speeds), all the power is transmitted through the epicyclic gear alone, and preferably with this gear rotating en bloc.

According to the present invention there is combined any suitable type of speed changing gear with an epicyclic gear including a member carrying planetary pinions, two of the members of the epicyclic gear being connected respectively to the vehicle engine, and to the vehicle road wheels, the third member or part of the epicyclic gear forming the control member, and being driven by a secondary speed varying gear interposed between the control member and the engine driven shaft, the arrangement being such that the power transmitted from the engine driven shaft to the road wheels through the secondary speed varying gear is a portion only of the total power transmitted and such that in a certain position or positions of the gear none of the said power is transmitted through the said interposed speed changing gear.

In some arrangements of the invention the epicyclic gear comprises two members which may be co-axially disposed spur or bevel wheels, and a third member comprising a cage carrying the planetary pinions and being rotatable about the common axis; one of the members is connected to the shaft driven through the clutch by the vehicle engine; another of the members is connected to the road wheels through the usual differential gear; the third member is the control member adapted to be driven by the engine driven shaft through a secondary speed changing gear preferably of the continuously variable type, by means of which the speed of the control member is varied. With a uniform unidirectional rotation of the engine shaft, the speed of the shaft driving the road wheels may, according to the invention, by varying the speed of the control member, be continuously changed from maximum speed in the forward direction down to and through zero to a suitable reverse speed.

I prefer to arrange the control gear so that if the control shaft be disconnected from the speed varying gear and be left free, the engine driven shaft, the control shaft, the control gear, the epicyclic gear and the shaft driving the road wheels, will all rotate as a whole without relative rotary movement between the epicyclic gear wheels. This gives the top or other normal speed at which the vehicle is primarily designed to run.

This is accomplished by arranging in the control gear a pair of driving elements having a comparatively high velocity ratio, such as a worm and a worm wheel, or a gyrating wheel and Oldham coupling and a gear wheel or wheels driven thereby, the arrangement being such that whilst the high speed element which is driven by the control is adapted to drive the low speed element, the latter element is locked against rotation about its own axis except when rotated by the former element; for example, the said pair of elements may consist of a worm and worm wheel the threads of the worm being cut at an angle less than the limiting angle of friction, so that the worm may rotate to drive the worm wheel, the worm wheel being incapable, by rotation about its own axis to drive the worm; or the said pair of elements may comprise a crank or eccentric of small throw adapted to rotate the axis of a gyrating gear wheel, which may be the high speed member of the pair, and is combined with an Oldham coupling or equivalent device so arranged that it drives the low speed member in such manner that the latter is incapable by rotation about its own axis to drive the gyrating wheel.

With this arrangement, at the top or normal speed of the vehicle, the transmission is direct, the whole of the gear rotating en bloc with the engine-driven shaft, without power being necessarily transmitted through the secondary speed varying gear.

If, however, rotation be imparted to the control shaft, for example, with one arrangement of gear, at a higher speed but in the same direction as the engine-driven shaft, the speed of the shaft driving the road wheels will be reduced; and if the said speed of the control shaft in the same direction be increased still further a point will be reached at which the shaft driving the road wheels stops; still further increase of speed of the control shaft in the same direction will cause the shaft driving the road wheels to be rotated in the opposite direction, and this gives the reverse.

The invention includes modifications as described and claimed herein.

The invention is illustrated in the accompanying drawings, in which:—

Figs. 1 and 2 are diagrammatic views;

Fig. 1 being an elevation in section on a longitudinal medial plane and

Fig. 2 being an end view partly in section.

Figs. 3 to 14 show a constructional embodiment of the arrangement diagrammatically illustrated in Figs. 1 and 2.

Figs. 3 and 4 taken together form a section on a longitudinal medial plane.

Figs. 5 and 6 are corresponding end elevations in cross section on the respective lines V, V, and VI, VI of Fig. 3.

Figs. 7, 8 and 9 are part end elevations in section on the lines VII, VII; VIII, VIII; of Fig. 11, and IX, IX; of Fig. 3.

Fig. 11 is a detail in section on the line XI, XI, of Fig. 8, and

Figs. 12, 13 and 14 are views of the Oldham coupling.

Fig. 15 is an elevation showing a modification of the secondary speed varying gear.

Fig. 16 shows an application of the invention to an ordinary type of gear box.

Figure 7:
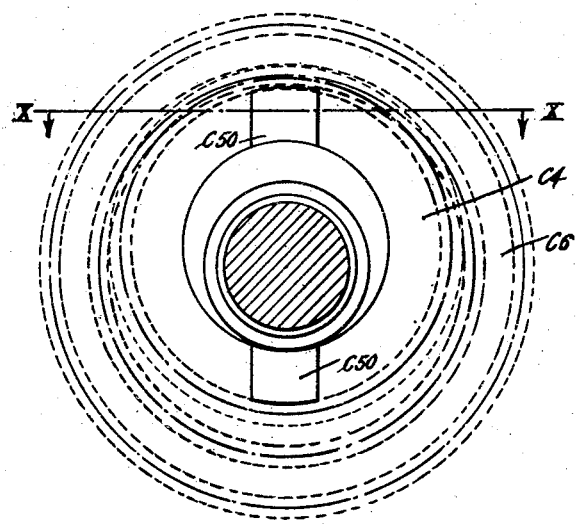
Figure 10:
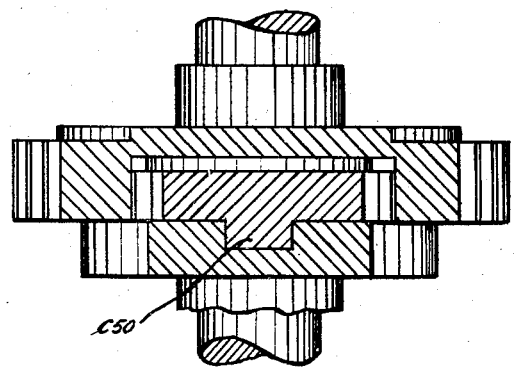
Fig. 10 is a detail section on the line X, X; of Fig. 7.

Throughout the drawings the similar main parts in the several modifications are indicated by the same reference letter or numeral, and in the case of sections, the plane of section is denoted by Roman numeral corresponding with the figure number of the section, and the direction in which the sections are viewed are indicated by the arrows adjacent the numerals.

Throughout the drawings:—$A'$ is the driving shaft rotated by the vehicle engine at an approximately constant speed, $A$ is the member of the epicyclic gear driven by the shaft $A'$; $B'$ is the driven shaft connected to the vehicle road wheels; $B$ the member of the epicyclic gear driving the shaft $B'$; $C'$ the control shaft; $C$ the control member of the epicyclic gear controlled by $C'$; and $D$ the secondary continuous speed varying gear.

Referring now to Figs. 1 and 2:—

The driving shaft $A'$ rotated by the engine, is connected to the inner wheel $A$ of the epicyclic gear, the driven shaft $B'$ connected to the road wheels being keyed to the internally toothed outer member $B$.

$C$ is the control member, freely mounted concentrically with the driving shaft $A'$, and carrying pairs of connected planetary pinions $c21$ and $c22$, the pinions $c21$ gearing with the wheels $A$ and $B$ and the pinions $c22$ gearing with the external teeth on the member $C6$, which is concentrically and freely mounted relatively to the driving shaft $A'$, the member $C6$ having internal teeth which gear with the external teeth of the gyrating wheel $C4$ mounted on an eccentric part $c24$ of the control shaft $C'$.

$C5$ is an Oldham coupling interposed between the gyrating wheel $C4$ and the casing $C$ so as to maintain these in fixed angular relationship. $d10$ is a friction roller driven by the disc $D$ from the driving shaft $A'$ as before.

The eccentrically mounted gyrating wheel $C4$ and the Oldham coupling $C5$, interposed between the control member $C$ and the control shaft $C'$, prevent rotation of $C$ relatively to $A'$ if the control shaft be free to rotate at or be driven at the same speed as $A'$.

The action is as follows: When the wheel $d10$ is in such a position that the control shaft is driven at the same speed as the shaft $A'$, the gearing rotates en bloc without relative rotation between the component parts of the epicyclic gear, and the shaft $B'$ is driven at the same speed as the shaft $A'$. If in this position the disc $D$ be raised clear of the wheel $d10$ the shaft $C'$ will automatically rotate at the same speed as the shaft $A'$ by reason of the locking action of the gyrating wheel and the Oldham coupling so that at top or normal speed the continuous speed varying gear may be put out of action.

If however the disc $D$ be kept in contact with the wheel $d10$ and the latter be moved outwardly so as to increase the speed of rotation of $C'$, the speed of $B'$ will be reduced, reaching zero value, and then, as $d10$ is moved further outwardly, having its direction of rotation reversed so as to give reverse driving of the gear.

Referring now to Figs. 3 to 14:

These figures illustrate a constructional embodiment of the modification illustrated diagrammatically in Figs. 1 and 2, and, referring in the first instance to Figs. 3 and 4, which taken together show the general arrangement of the gear:

$A'$ is the driving shaft rotated by the engine; on the coned part $c23$ at the left hand end of which shaft the inner wheel $A$ of the epicyclic gear is secured in position by a key and nut $a24$.

The outer internally toothed wheel $B$ of the epicyclic gear is secured to the shaft, or the coupling of the shaft $B'$ connected to the road wheels of the vehicles; $C$ is the control member which is a cage carrying pairs of connected planetary pinions $c25$ and $c26$ mounted on sleeves $c27$ journalled on spindles $c28$ carried by the cage $C$, the pinions $c25$ gearing with the wheels A and B and the pinions c26 gearing with the external teeth on the wheel C6 freely mounted on a sleeve c29 on the shaft A. C4 is the gyrating wheel the external teeth of which gear with the internal teeth on the wheel C6. The gyrating wheel is mounted on an eccentric part c24 formed on the control shaft C' so that as the latter shaft rotates the centre of the gyrating wheel is rotated.

C5 is an Oldham coupling interposed between the cage C and the gyrating wheel C4 and adapted to maintain these two parts in fixed angular relationship.

C7 is a free-wheel device adapted to prevent rotation of the control shaft in the one direction relatively to the cage C.

The sectional end elevation Fig. 5 shows the arrangement of the planetary wheels c25, mounted on the spindle c28 carried by the cage, which planetary wheels gear with the centre wheel A and the internally toothed wheel B. Fig. 6 shows the planetary pinions c26 attached to the planetary wheels c25, and gearing with the external teeth of the member C6, with the internal teeth of which member C6 the teeth of the gyrating wheel C4 engage. Fig. 7 is an enlarged view of the central portion of Fig. 6, and shows the member C6, and the gyrating wheel C5 mounted on the eccentric c24. The gyrating wheel has two projections c50, and these (see Fig. 10) engage one of the slots c51 of the Oldham coupling C5. The casing C has projections c52 (see Fig. 11) which engage with the other slot c53 of the Oldham coupling. The Oldham coupling thus permits the rotation of the centre of the gyrating wheel relatively to the casing whilst maintaining the gyrating wheel and the casing in fixed angular relationship.

The free wheel device for preventing rotation of the casing C in one direction relatively to the control shaft C' may consist of any of the usual known free-wheel devices. In the arrangement shown in Fig. 9 inclines c54 are formed on a collar c55 attached to the shaft C', and rollers c56 engaging the inclines and the bore c57 of the casing C prevent the rotation of the latter, in the direction of the arrow, relatively to the control shaft C'.

Roller or ball bearings 1 are interposed between a journal on the wheel A and the coupling b10 of the shaft B'; and ball or roller bearings 2 are interposed between the cage C and a journalled portion of the wheel A. Roller or ball bearings 3 are interposed between the cage C and a journal on the control shaft C'.

The shaft A' is journalled in bushes 4 and 4' fitting the interior of the control shaft C'.

The whole of the gear is enclosed in a fixed casing E which is bolted to the chassis of the vehicle; ball or roller bearings 5 and ball or roller bearings 6 being interposed respectively between the control shaft C' and the casing and between the coupling b10 and the casing.

d10 is a friction wheel having a renewable friction surface d14 adapted to engage the surface of the disc D; suitable levers engaging with the groove d13, is provided for actuating in an axial direction the friction wheel d10. The disc D is driven by a mitre wheel a10 keyed to the shaft A' and gearing with the mitre wheel d12, made integral with or attached to the spindle d11 to which the disc D is keyed or splined.

The boss d15 of the disc D is carried by roller or ball bearings 7 and ball bearings 8 from a casing d16 rotating in the bore e1 of the boss e2 carried by the main casing E' which is rigidly connected to the casing E (Fig. 3).

A portion of this boss e2 is screw-threaded as at e3 to take corresponding screw threads d17 formed on the casing d16.

When therefore the casing d16 is rotated it is moved axially and raises the disc D out of contact with the wheel d10, axial movement of the spindle d11 and bevel wheel d12 being prevented by the ball race 9 by which the bevel wheel is journalled into the enclosing casing E which also carries ball or roller races 10 to support this end of the shaft A' which passes out of the casing E and is connected to the engine clutch member of the vehicle.

Glands 11 are fitted as required to prevent leakage of oil.

The Oldham coupling C5 by preventing the gyrating wheel C4 from rotating about its own axis relatively to the cage C, causes the gyrating wheel, by rotation of its centre by the control shaft, to rotate the wheel C6, and as the planetary pinions c26 gear with the external teeth of the wheel C6 and are fixed to the planetary pinions c25 engaging the teeth of the driving wheel A and of the driven wheel B, it will be seen that the speed of the cage and the planetary pinions on their axes, and therefore the rotation of the wheel B is determined by the speed of the control shaft C' which drives the gyrating wheel. As stated, when the control shaft rotates at the same speed as the shaft D' the direct drive is transmitted without relative rotation between the planetary pinions and the wheels gearing with them.

Fig. 15 illustrates a continuously variable control gear which may be substituted for the speed varying gear shown in any of the modifications described. H is a coned roller feathered on the shaft A' and pressed, by a spring h1 bearing against a collar h10 fixed to the shaft A', towards an axially adjustable abutment h2; an operating sleeve h3 being interposed and moving with H. C' is the control shaft, h4 a bevel wheel keyed to the control shaft gearing with the bevel wheel h5 keyed to the shaft h6 which is carried in fixed bearings so as to lie parallel with the cone surface of H. h7 is a friction wheel, the periphery of which makes frictional contact with the cone surface of H; the wheel h7 is adapted to be moved axially by means engaging with the groove h8.

In the position shown the shaft C' is rotated at the desired maximum speed, which speed may continuously be reduced by moving the friction wheel h7 along the feather-way in h6. Should it be desired to put the speed varying gear out of operation, and leave the control shaft C' free, the cone H is, by means of the sleeve h3, moved axially to the left against the spring h1, thus freeing the wheel h7 from the rotating cone H. Wear between the members H and h7 is compensated for by axial movement of the adjustable abutment h2 to the right, such abutment being fixed in position by a tightening screw h9.

The gearing between the control shaft and the control member in the various modifications may, by fitting an idle wheel, be so arranged that when the control shaft rotates at the same speed as the driving shaft, a straight-through drive is obtained as described, but that as the control shaft is slowed down the speed of the epicyclic member driving the road wheels is slowed down, this member giving the desired reverse speed when the control shaft is stopped, or rotating slowly. In this case the secondary speed control gear would be arranged to vary the speed of the control member from that equal to and in the same direction as the driving shaft, to the desired minimum speed to give the reverse.

Instead of employing a speed varying gear of the continuously variable type the speed varying gear may be of the ordinary step-by-step type such as is obtained by the employment of an ordinary gear box.

This arrangement is shown in Fig. 16 in which K is a gear box through which the shaft A' passes, and in which there is a lay shaft k1 having sets of gear wheels mounted on a sliding bush, which gear by sliding the bush, may be made to give in various combinations with corresponding sets of gear wheels keyed to the shaft A'. The lay shaft k1 which it is assumed always rotates in a direction opposite to that of A', at any one of the desired speeds, is connected by the gear wheels k2, keyed to the lay shaft, and k3 keyed to the control shaft C', which may be the control shaft in any of the modifications described.

The details of construction may be varied in accordance with the type of vehicle to which the invention is applied, the speeds to be controlled and the power to be transmitted.

Having now fully described our invention we declare that what we claim and desire to secure by Letters Patent, is:—

1. In a speed changing and reversing gear for a motor vehicle, in combination;—an epicyclic gear comprising two members which are adapted, respectively, to be driven by the driving shaft and to drive the driven shaft, a control member forming part of the said gear, a control shaft mounted on the driving shaft; secondary variable speed changing gears between the control shaft and driving shaft; a gyrating gear wheel mounted on an eccentric part of the control shaft, and means between the gyrating gear wheel and a part of the apparatus separate therefrom which whilst permitting rotation of the gear wheel centre prevent rotation of the gear wheel relatively to the said part; and a gear wheel driven by the gyrating gear wheel and geared to the said control member of the epicyclic gear.

2. In a speed changing and reversing gear for a motor vehicle, in combination;—an epicyclic gear two members of which are adapted, respectively, to be driven by the vehicle engine, and to drive the vehicle road wheels, and a control member forming part of the said gear; a control shaft; secondary speed changing gear by which the driving shaft drives the control member through the control shaft; a gyrating wheel journalled on an eccentric part of the control shaft; an Oldham coupling device connecting the gyrating wheel to one of the members of the epicyclic gear; a gear wheel mounted concentrically with the control member; and a free wheel device interposed between the control shaft and one of the elements of the epicyclic gear.

3. In a speed changing and reversing gear for motor vehicles, in combination;— a driving shaft; a spur wheel connected to the driving shaft; an internally toothed spur wheel adapted to drive the vehicle road wheels; an externally and internally toothed wheel mounted concentrically about the driving shaft; a control shaft; secondary continuously variable speed changing gear connecting the driving shaft to the control shaft; a gyrating wheel rotatably mounted on an eccentric part of the control shaft, the teeth of the gyrating wheel gearing with the internal teeth of the internally and externally toothed wheel; a cage rotatable about the axis of the driving shaft; pairs of connected planetary pinions carried by the cage, one pinion of each pair gearing with the spur wheel keyed to the driving shaft and with the internally toothed spur wheel adapted to drive the vehicle road wheels, the other planetary pinion of each pair gearing with the external teeth of the internally and externally toothed wheel; and an Oldham coupling type device connecting the gyrating wheel to the cage; substantially as described.

4. In a speed changing and reversing gear, in combination;—an epicyclic gear one of the members of which is connected to the driven shaft and another member of which is a controlling member; a control shaft; speed varying gears through which the control shaft is driven by the driving shaft; a co-acting pair of driving elements interposed between the control shaft and the control member and adapted to permit the rotation of the control member by the rotation of the control shaft, but to lock the control member against rotation about its own axis except when it is rotated by the control shaft; and a free-wheel device interposed between the control shaft and one of the elements of the epicyclic gear; substantially as described.

5. In speed changing and reversing gear for a motor vehicle, in combination;—an epicyclic gear comprising planetary pinions mounted in a rotatable cage, a gear wheel fixed to the driving shaft and gearing with the planetary pinions, and a gear wheel fixed to the driven shaft and gearing with the planetary pinions; a control shaft mounted co-axially with the driving shaft; speed varying gear through which the control shaft is driven by the driving shaft; a gyrating spur wheel mounted eccentrically on the control shaft and gearing with a spur wheel mounted concentrically with the control shaft; spur gearing connecting a last mentioned spur wheel to the planetary pinions; and an Oldham coupling device connecting the gyrating wheel to the cage.

6. In apparatus as claimed in claim 3, a free-wheel device interposed between the control shaft and one of the elements of the epicyclic gear; substantially as described.

7. In apparatus as claimed in claim 5, a free-wheel device interposed between the control shaft and one of the elements of the epicyclic gear; substantially as described.

In testimony whereof, we have set our hands.

JOHN STANDEN SHAW.
WALTER HEAP.
GEORGE WILLIAM WATSON.